(12) United States Patent
Matsui et al.

(10) Patent No.: US 6,586,910 B2
(45) Date of Patent: Jul. 1, 2003

(54) VOLTAGE EQUALIZER APPARATUS AND METHOD THEREOF

(75) Inventors: Fujio Matsui, Tokyo (JP); Mitsunori Ishii, Tokyo (JP); Seiichi Anzawa, Nagano (JP); Hiroshi Nishizawa, Nagano (JP)

(73) Assignees: Fuji Jukogyo Kabushiki Kaisha (JP); Nagano Japan Radio Co., Ltd. (JP)

( * ) Notice: Subject to any disclaimer, the term of this patent is extended or adjusted under 35 U.S.C. 154(b) by 0 days.

(21) Appl. No.: 09/983,013

(22) Filed: Oct. 18, 2001

(65) Prior Publication Data

US 2002/0074985 A1 Jun. 20, 2002

(30) Foreign Application Priority Data

Oct. 19, 2000 (JP) ........................................ 2000-319118

(51) Int. Cl.[7] .................................................. H02J 7/00
(52) U.S. Cl. ...................................................... 320/122
(58) Field of Search ................................ 320/122, 118, 320/130, 132; 307/43, 77; 361/88

(56) References Cited

U.S. PATENT DOCUMENTS 5,594,320 A * 1/1997 Pacholok et al. ........... 320/117
6,046,514 A * 4/2000 Rouillard et al. ........... 320/122

FOREIGN PATENT DOCUMENTS

JP 08214454 * 2/1995

* cited by examiner

Primary Examiner—Edward H. Tso
Assistant Examiner—Pia Tibbits
(74) Attorney, Agent, or Firm—Rosenthal & Osha L.L.P.

(57) ABSTRACT

In such a voltage equalizer circuit in which each of plural windings P1 to Pn electromagnetically coupled to each other, each of plural storage elements E1 to En series-connected to each other, and each of plural first switching elements S1 to Sn are connected to each other in a series connecting manner so as to constitute a plurality of closed circuits, this voltage equalizer apparatus is featured by that a reference voltage winding Pp electromagnetically coupled to the plurality of windings is provided; both a DC power supply Ep and a second switching element Sp are series-connected to the second winding; and all of the plural first switching elements and the second switching element are turned ON/OFF in a synchronous manner.

28 Claims, 9 Drawing Sheets

VOLTAGE EQUALIZER APPARATUS AND METHOD THEREOF

BACKGROUND OF THE INVENTION

1. Field of the Invention

The present invention relates to a technique capable of equalizing voltages across both terminals of the respective series-connected storage elements in such a manner that energy is transferred among a plurality of series-connected storage elements which are mounted on an electric automobile, an energy-hybrid type vehicle, and various sorts of systems capable of using storages of electric energy.

2. Description of the Related Art

Japanese Laid-open Patent Application No. Hei-8-214454 and U.S. Pat. No. 5,594,320 discloses voltage equalizer circuits.

Generally speaking, a voltage equalizer circuit disclosed in these publications is referred to as a "flyback type voltage equalizer circuit." As indicated in FIG. 8, the flyback type voltage equalizer circuit is equipped with a transformer having a plurality of secondary windings n2 to n4; a switch SW1 connected to a primary winding n1 of this transformer T1; a plurality of rectifying circuits CR1, CR2, CR3 connected to the respective secondary windings n2, n3, n4 of the transformer T1; and charging circuits for connecting outputs of the respective rectifying circuits in each of unit cells. In this flyback type voltage equalizer circuit, constant electric power outputs of the respective secondary windings are rectified which are obtained by switching the primary winding of the transformer by the switch SW1, and then, each of the unit cells of capacitor batteries C1, C2, C3 which are constituted to be series-connected to each other is charged by the constant electric power outputs. As a result, when a battery voltage of a unit cell is low, a charge current becomes large, whereas when a battery voltage of a unit cell is high, a charge current becomes small, so that a plurality of series-connected battery voltages can be automatically and equally charged to the capacitor batteries.

In such a flyback type voltage equalizer circuit, while such a cycling operation between the charging operation and the discharging operation is repeatedly carried out by the switch, since the electric power is supplied from the power supply side every time switching operation is performed, the battery voltage is increased. Even when the battery voltage is reached to a predetermined voltage value, since the switching operation is continued, the resulting battery voltage is more and more increased, and finally, the battery may be brought into the overcharge condition. Such a flyback type voltage equalizer circuit necessarily requires the circuit capable of preventing the overcharge condition, and therefore, owns such a problem that the entire circuit thereof becomes complex and is manufactured in high cost.

Also, generally speaking, the voltage equalizer circuit described in the above-described U.S. Pat. No. 5,594,320 is referred to as a forward type voltage equalizer circuit. As shown in FIG. 9, in this forward type voltage equalizer circuit, a plurality of closed circuits are arranged in such a manner that each of batteries constituted by series-connecting a plurality of cells 11, 12, 60, 61, each of plural windings 67 to 70, and each of plural first switching elements 72 to 75 are series-connected to each other. Since all of these switching elements 72 to 75 are turned ON/OFF in the synchronous manner, a charging operation is carried out from a battery having a high cell voltage into a battery having a low cell voltage. As a result, voltages among the terminals of the respective cells may be equalized.

Such a forward type voltage equalizer circuit may have a function capable of equalizing the respective terminal voltages of these plural battery cells. However, the equalized voltages become the averaged voltage (correctly speaking, voltage equivalent to such a condition that battery energy is averaged) of the respective battery voltages, so that the battery voltage cannot be converged to the target voltage. Also, since the equalizer itself does not own the charging function, when the equalizing operation is continued, the discharge operation of the battery is carried out by the energy loss consumed by this equalizer. As a result, there is a risk that the battery may be brought into the over discharge condition.

SUMMARY OF THE INVENTION

The present invention has been made to solve the drawbacks of the above-explained flyback type voltage equalizer circuit and forward type voltage equalizer circuit, and therefore, has an object to provide a voltage equalizer apparatus for storage elements, capable of converging voltages among terminals of a plurality of series-connected storage elements to a final target value, while equalizing operation is carried out without occurrences of overcharging operation and of overdischarging operation.

To solve the above-described problem, according to an aspect of the present invention, in such a voltage equalizer apparatus in which each of plural windings electromagnetically coupled to each other, each of plural storage elements series-connected to each other, and each of plural first switching elements are connected to each other in a series connecting manner so as to constitute a plurality of closed circuits, a reference voltage winding electromagnetically coupled to the plurality of windings is provided; both a DC power supply and a second switching element are series-connected to the reference voltage winding; and all of the plural first switching elements and the second switching element are turned ON/OFF in a synchronous manner. As a consequence, the terminal-to-terminal voltages of the plural storage elements which are series-connected to each other can be converged to a final target value without risks of overcharging operation and overdischarging operation with respect to the storage elements, while performing the voltage equalizing operation.

Also, while the plural series-connected storage elements are series-connected to the DC power supply so as to constitute the voltage equalizer apparatus, the overall DC output may be connected to both an external power supply and an external load.

Also, since the output voltage of the DC power supply is variable, the terminal-to-terminal voltages of the plural series-connected storage elements may be converged to an arbitrary voltage.

Also, the DC power supply owns a bidirectional characteristic and is provided with an apparatus capable of supplying electric power to the plurality of series-connected storage elements, and also, capable of absorbing electric power supplied from the plurality of series-connected storage elements. As a result, the terminal-to-terminal voltages of the plural series-connected storage elements may be made lower than the present voltages.

Also, the voltage equalizer circuit comprises a voltage detecting section for detecting voltages among terminals of the plurality of series-connected storage elements; and the voltage of the DC power supply is set in response to an averaged terminal-to-terminal voltage of the storage elements, which is calculated from the voltage detecting section. As a result, since the terminal-to-terminal voltages of the storage elements can be gradually increased, the terminal-to-terminal voltages of the plural series-connected storage elements can be converged to the final target value without increasing the current capacities of the switching elements and also the capacity of the DC power supply.

It should be noted that when the storage elements are constituted by electric double layer capacitors, the allowable minimum voltage thereof is equal to a zero volt.

Also, the output voltage of the DC power supply is set between an allowable maximum voltage and an allowable minimum voltage, which are determined based upon a material of the storage element. As a result, the terminal-to-terminal voltages can be converged to the final target value, while neither a specifically-designed abnormal voltage detecting circuit, nor a protection circuit is provided with respect to the plural series-connected storage elements.

Also, according to another aspect of the present invention, in such a voltage equalizer circuit in which each of plural windings electromagnetically coupled to each other, each of plural storage elements series-connected to each other, and each of plural first switching elements are connected to each other in a series connecting manner so as to constitute a plurality of closed circuits, a reference voltage winding electromagnetically coupled to the plurality of windings is provided; both a DC power supply and a second switching element are series-connected to the reference voltage winding; a third switching element is provided so as to connect a monitoring storage element between series-connecting terminals of the reference voltage winding and the second switching element, and also so as to interrupt the connection between the DC power supply and the monitoring storage element; all of the plural first switching elements and the second switching element are turned ON/OFF in a synchronous manner; and the third switching element is turned OFF when a voltage between terminals of the monitoring storage element is monitored. As a result, an averaged terminal-to-terminal voltage of the plural series-connected storage elements can be readily detected.

Also, while the plural series-connected storage elements are series-connected to the DC power supply so as to constitute the voltage equalizer apparatus, the overall DC output may be connected to both an external power supply and an external load.

Also, since the DC power supply is capable of varying the voltage, the voltage of the DC power supply can be properly varied with reference to the detected averaged terminal-to-terminal voltage of the monitoring storage element. As a result, for instance, the terminal-to-terminal voltage of the plural series-connected storage elements can be converged to an arbitrary voltage without giving a load to the switching element.

Also, the DC power supply owns a bidirectional characteristic and is provided with an apparatus capable of supplying electric power to the plurality of series-connected storage elements, and also, capable of absorbing electric power supplied from the plurality of series-connected storage elements. As a result, in the case that the voltage of the DC power supply is set to be such a voltage lower than the detected averaged terminal-to-terminal voltage of the plural storage elements, the energy supplied from the plural storage elements is consumed on the side of the DC power supply, and thus the voltage of the DC power supply is continuously maintained at a low voltage. As a consequence, the terminal-to-terminal voltages of the plural series-connected storage elements can be converged to an arbitrary low voltage.

Also, the voltage equalizer circuit comprises a voltage detecting section for detecting a voltage between terminals of the monitoring storage element; and the voltage of the DC power supply is set in response to an averaged terminal-to-terminal voltage of the storage elements, which is calculated from the voltage detecting section. As a result, the voltage of the DC power supply can be properly set in correspondence with the current capacity of the switching element and the capability of the DC power supply.

Also, the output voltage of the DC power supply is set between an allowable maximum voltage and an allowable minimum voltage, which are determined based upon a material of the storage element. As a consequence, since a voltage applied to a storage element is limited between an allowable maximum voltage and an allowable minimum voltage, which are determined in accordance with a material and the like of this storage element, it is possible to prevent this storage element from being destroyed.

Also, in the case that a voltage between the terminals of the monitoring storage element during OFF time period of the third switching element exceeds a predetermined voltage, an external charging operation with respect to the plurality of series-connected storage elements is stopped and/or a warning notice is issued. As a result, such a fact that a voltage applied to a storage element is increased higher than, or equal to an overcharging voltage determined in accordance with the material of this storage element is notified to an operator, and furthermore, the equalizing operation is stopped, which can avoid that the voltage applied to the storage element is furthermore increased higher than the allowable maximum voltage.

Also, in the case that a voltage between the terminals of the monitoring storage element during OFF time period of the third switching element becomes lower than, or equal to a predetermined voltage, ON/OFF operations of the first switching elements and the second switching element are stopped and/or a warning notice is issued. As a result, for instance, such a fact that a voltage applied to a storage element is approximated to a discharge end voltage determined based upon the material of this storage element is notified to an operator, and the equalizing operation is stopped, which can avoid that the voltage applied to the storage element is furthermore decreased lower than the discharge end voltage.

Also, since the storage elements and/or the voltage monitoring storage element are electric double layer capacitors, such a capacitor having a large capacitance may be employed instead of a battery.

Also, since the third switching element is constituted by a relay, timing at which this relay is turned OFF can be easily controlled by an equalizer controller.

Also, according to another aspect of the present invention, in such a voltage equalizer circuit in which each of plural windings electromagnetically coupled to each other, each of plural storage elements series-connected to each other, and each of plural first switching elements are connected to each other in a series connecting manner so as to constitute a plurality of closed circuits, a reference voltage winding electromagnetically coupled to the plurality of windings is provided; both a DC power supply and a second switching element are series-connected to the reference voltage winding; a monitoring storage element is connected between series-connection terminals of the reference voltage winding and the second switching element; and a diode is provided which is biased along a forward direction in such a case that the voltage of the DC power supply is higher than a voltage between terminals of the monitoring storage element, so that the diode supplies a current to the reference voltage winding; and further, all of the plural first switching elements and the second switching element are turned ON/OFF in a synchronous manner. As a consequence, the voltage equalizing apparatus can be made simple in such a use case that the energy need not be extracted from the plural series-connected storage elements to the side of the DC power supply.

Also, while the plural series-connected storage elements are series-connected to the DC power supply so as to constitute the voltage equalizer apparatus, the overall DC output may be connected to both an external power supply and an external load.

Also, according to another aspect of the present invention, a voltage equalizer circuit of a storage element is featured by that at least a plurality of closed circuits in which each of plural windings electromagnetically coupled to each other, each of plural storage elements series-connected to each other, and each of plural first switching elements are connected to each other in a series connecting manner; while a reference voltage winding electromagnetically coupled to the plurality of windings, another closed circuit constituted by the reference voltage winding, a DC power supply, and a second switching element; and a controller for turning ON/OFF all of the first switching elements and the second switching element in a synchronous manner are formed in an integral body of a module. As a result, both a voltage and a current of a single module can be set as rated values. Since a plurality of modules are used, such a system having an arbitrary voltage and an arbitrary current capacity can be readily arranged.

Also, the DC power supply is constituted by a bidirectional converter; one of input/output terminals of the bidirectional converter is connected to the monitoring storage element; and the other of the input/output terminals of the bidirectional converter is connected to a battery. As a result, in the case that the voltage of the DC power supply is changed so as to lower the terminal-to-terminal voltages of the plural series-connected storage elements than the present voltages, since the energy can be easily absorbed (consumed), such a system capable of especially realizing an effective control can be obtained.

Also, since the plurality of storage elements are arranged by that storage elements having a plurality of charging/discharging characteristics different from each other are connected in a parallel connecting manner, it is possible to supply such currents suitable for load characteristics in transient states while the charging operation and the discharging operation are carried out.

Also, according to another aspect of the present invention, in such a voltage equalizer apparatus of a storage element in which each of plural windings electromagnetically coupled to each other, each of plural storage elements series-connected to each other, and each of plural first switching elements are connected to each other in a series connecting manner so as to constitute a plurality of closed circuits; a reference voltage winding electromagnetically coupled to the plurality of windings is provided; both a DC power supply and a second switching element are series-connected to the reference voltage winding; a third switching element is provided so as to connect a monitoring storage element between series-connection terminals of the reference voltage winding and the second switching element, and also so as to interrupt the connection between the DC power supply and the monitoring storage element; all of the plural first switching elements and the second switching element are turned ON/OFF in a synchronous manner; and the third switching element is turned OFF when a voltage between terminals of the monitoring storage element is monitored, a voltage equalizing method of a storage element characterized in that; when a voltage between terminals of the storage element becomes such a value different from a target value by a predetermined voltage, or a higher voltage thereof, the plurality of storage elements are rapidly charged up to a predetermined charge voltage by a charging operation of an external power supply; and thereafter, both the first switching elements and the second switching element are turned ON/OFF so as to control the terminal-to-terminal voltage of the storage element to be equal to the target value. As a consequence, in the case that the terminal-to-terminal voltage of the storage element is low in such a case as when a system is initiated, and also this voltage becomes the value different from the target value by a predetermined voltage, the charging operation with respect to this storage element becomes short. As a result, after this storage element is quickly charged by the external power supply to the target value (preferably on the order of 95% of this target value, but not limited to this 95%), the equalizing operation is commenced. Thus, the storage element is gradually charged by way of the charging function of the voltage equalizer apparatus in such a manner that the charged voltage thereof is reached up to the target value, resulting in a rational charging operation.

Also, according to a further aspect of the present invention, in such a voltage equalizing apparatus of a storage element in which each of plural windings electromagnetically coupled to each other, each of plural storage elements series-connected to each other, and each of plural first switching elements are connected to each other in a series connecting manner so as to constitute a plurality of closed circuits; a reference voltage winding electromagnetically coupled to the plurality of windings is provided; both a DC power supply and a second switching element are series-connected to the reference voltage winding; a third switching element is provided so as to connect a monitoring storage element between series-connection terminals of the reference voltage winding and the second switching element, and also so as to interrupt the connection between the DC power supply and the monitoring storage element; all of the plural first switching elements and the second switching element are turned ON/OFF in a synchronous manner; and the third switching element is turned OFF when a voltage between terminals of the monitoring storage element is monitored, a voltage equalizing method of a storage element characterized in that: when a voltage between terminals of the storage element becomes such a value different from a target value by a predetermined voltage, or a higher voltage thereof, the voltage of the DC power supply is set to such a voltage on the side of the target value and also in the vicinity of an averaged voltage of the monitored storage element; and while both the first switching elements and the second switching element are turned ON/OFF, a control operation is carried out in such a manner that the voltage of the DC power supply is gradually approximated to the target value. As a result, the terminal-to-terminal voltage of the storage element can be changed by a proper changing manner without any risk in correspondence with the current capacity of the switching element and also the performance of the DC power supply.

DETAILED DESCRIPTION OF THE PRESENT INVENTION

Referring now to drawings, the present invention will be described in detail with reference to the accompanying drawings.

Figure 1:
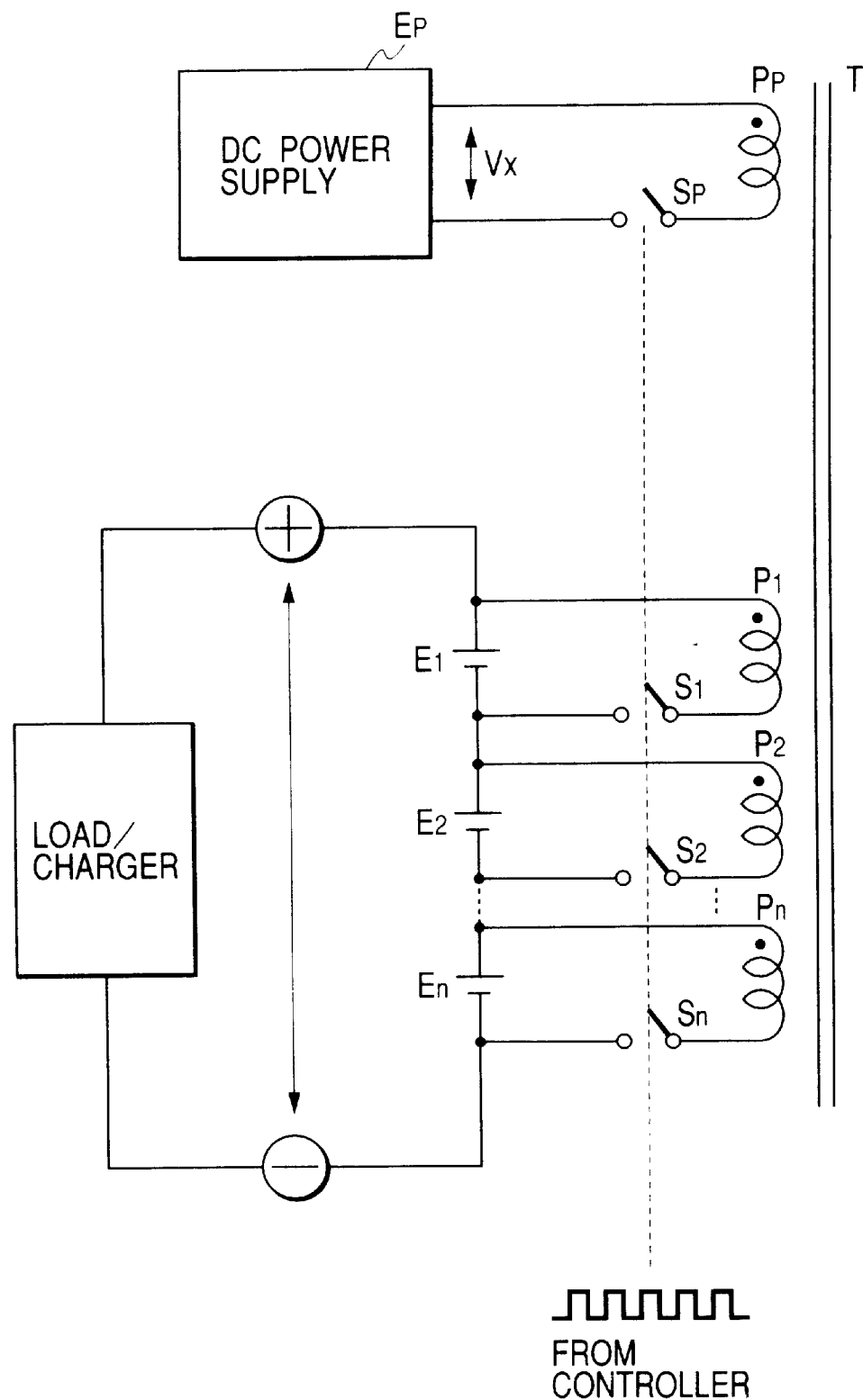
FIG. 1 is a diagram for indicating a basic circuit arrangement (first embodiment) of the present invention.

FIG. 1 is a diagram for indicating a basic circuit arrangement of the present invention. In FIG. 1, reference numerals P1 to Pn show a plurality of windings which are electromagnetically coupled to each other by a transformer T. Reference numerals S1 to Sn indicate a plurality of first switching elements. Reference numbers E1 to En represent storage elements which are series-connected to each other. These storage elements are constituted by such storage elements as batteries, electric double layer capacitors, or the like. Each of these first switching elements S1 to Sn, each of these windings P1 to Pn, and each of these storage elements E1 to En are series-connected to each other, so that a plurality of closed circuits are arranged. Also, series-connecting terminals "+" and "−" of the plural storage elements E1 to En series-connected to each other are connected to an external charging circuit and/or a load.

Also, reference numeral "Pp" shows a reference voltage winding which is electromagnetically coupled via the transformer T to the plural windings P1 to Pn. This reference voltage winding Pp is series-connected via a second switching element Sp to a DC power supply Ep, so that a closed circuit is constituted.

This DC power supply Ep corresponds to a variable DC power supply capable of varying an output voltage Vx.

In the circuit of FIG. 1, since the first switching elements S1 to Sn and the second switching element Sp are turned ON/OFF at the same time in response to a signal supplied from a controller (not shown), the below-mentioned action is repeatedly carried out every time the switching elements are turned ON/OFF, so that terminal voltages of the plural storage elements E1 to En, or the terminal voltage of the DC power supply can be equalized. In accordance with this action, within time periods of these switching operations, a discharge current derived from such a storage element having a high terminal voltage among the plural storage elements E1 to En, or the DC power supply may cause a charge current to flow through such a storage element having a low terminal voltage among the plural storage elements E1 to En, or the DC power supply via the transformer T which is electromagnetically coupled to each other. This action is repeatedly carried out every time the switching elements are turned ON/OFF, so that the terminal voltages of the plural storage elements E1 to En, or the DC power supply can be equalized.

For a better understanding, in this circuit, the following explanation is made in such that turn numbers of the respective windings are equal to each other. When the output voltage of the DC power supply Ep is set to be higher than the averaged voltage of the voltages among the terminals of these plural storage elements E1 to En, the energy is supplied from this DC power supply Ep via the transformer T which is electromagnetically coupled to these storage elements. As a result, the averaged voltage among the terminals of the plural storage elements can be increased.

Also, contrary to the above-described case, when the output voltage of the DC power supply Ep is set to be lower than the averaged voltage of the voltages among the terminals of these plural storage elements E1 to En, the energy is supplied other than this DC power supply Ep via the transformer T which is electromagnetically coupled to these storage elements. As a result, the averaged voltage among the terminals of the plural storage elements can be decreased, since this supplied energy may constitute the charge energy with respect to the DC power supply Ep.

The above-explained increasing operation, or decreasing operation of the voltages among the terminals of these storage elements may be carried out by supplying the energy from the DC power supply, or by absorbing the energy by the DC power supply. It is not preferable to increase the current capacity of the switching element, and also to increase the capacity of the DC power supply in view of economical aspects. As a consequence, while a difference between the averaged value of the voltages among the terminals of the plural storage elements and the voltage Vx of the DC power supply is set to be a small value so as to average the voltages, it is so preferable that the output voltage of the DC power supply is varied so as to be converged to the target value.

Figure 2:
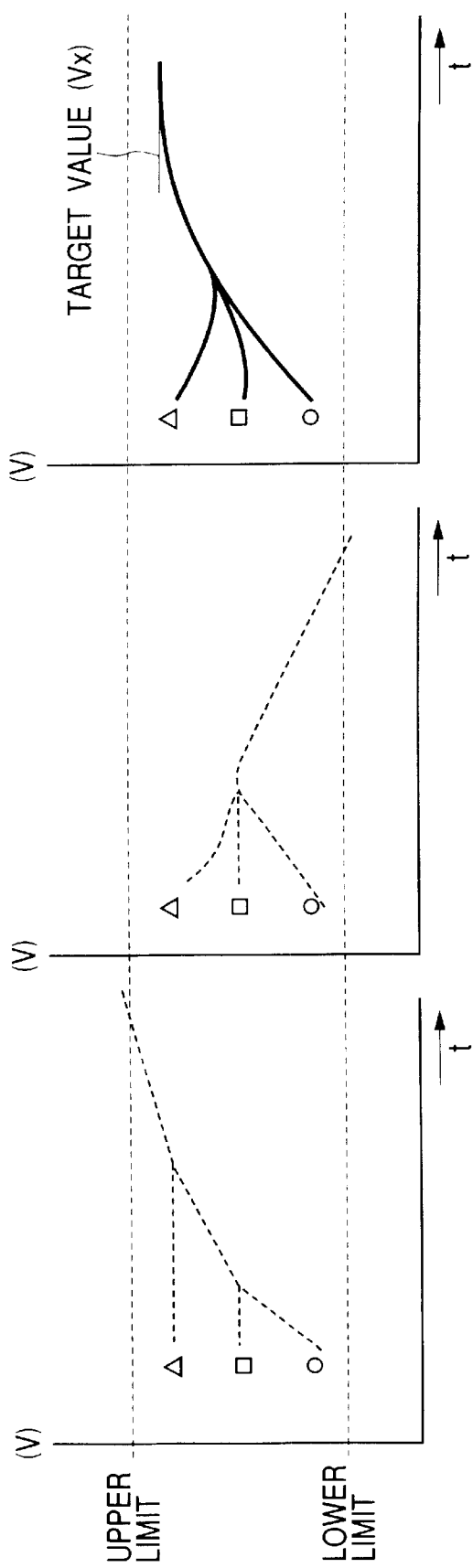
FIGS. 2A, 2B and 2C are diagrams for explaining operations of the present invention.

Referring now to FIGS. 2A, 2B and 2C, a description will be made of a comparison result as to the equalizing operation of the voltages among the storage elements by the voltage equalizer circuit of the present invention with respect to the conventional fly back type and forward type voltage equalizer circuits.

FIG. 2A represents a change in the terminal-to-terminal voltages of the respective storage elements in response to a change in time in the case that the voltage equalizing operation of the conventional flyback type voltage equalizer circuit is repeatedly carried out.

In this drawing, symbols "Δ", "□" and "○" indicate terminal-to-terminal voltages of the respective storage elements in the case that, for instance, three storage elements are connected to each other in a series connecting manner (in this case, for sake of easy explanation, although differences among voltages of respective storage elements are largely indicated, there is very rare that such a large difference may be actually produced).

A description will now be made of equalizing operations in such a case that there is a difference in terminal-to-terminal voltages among a plurality of storage elements with reference to FIG. 2A.

Energy supplied from an external power supply is stored into a flyback transformer (namely, energizing energy) by a switching operation, and then, the stored energizing energy is released in a concentration manner to the storage element "○" whose terminal-to-terminal voltage is the lowest value.

Since the above-explained operation is continued, when the terminal-to-terminal voltage of the storage element "○" is increased up to the terminal-to-terminal voltage of the storage element "□" to be equal to this terminal-to-terminal voltage, the averagizing energy may be equal to these storage elements "○" and "□". Furthermore, when the terminal-to-terminal voltages of the storage elements "○" and "□" are increased to become equal to the terminal-to-terminal voltage of the storage element "Δ", the energizing energy is released to be distributed to these storage elements "○", "□", and "Δ". As previously explained, in the case of such a flyback type voltage equalizer circuit, since the energizing energy which has been stored during the ON time of the switching operation is surely released during the OFF time of the switching operation, the terminal-to-terminal voltages of the storage elements are firmly and continuously increased while time elapses, and then, exceed the allowable upper limit voltage for the storage elements as represented in FIG. 2A.

FIG. 2B represents a change in the terminal-to-terminal voltages of the respective storage elements in response to a change in time in the case that the voltage equalizing operation of the conventional forward type voltage equalizer circuit is repeatedly carried out.

In the above-described FIG. 2B, the equalizing operation is carried out in such a manner that energy is supplied from a storage element having a high terminal-to-terminal voltage into another storage element having a low terminal-to-terminal voltage (namely, energy is supplied from storage element "Δ" to storage element "○" in this drawing) in such a case that there is a difference in terminal-to-terminal voltages among a plurality of storage elements with reference to FIG. 2A.

Furthermore, even after all of the terminal-to-terminal voltages of these storage elements become equal to each other in the case that the equalizing operation by turning ON/OFF the switching element is continued, although no energy is supplied from the external power supply, loss is produced due to the switching loss caused by the equalizing operation. As a result, as indicated in FIG. 2B, the terminal-to-terminal voltages of the storage elements are continuously decreased, and finally, may become lower than, or equal to the allowable lower limit voltage.

In contrast to the above-described cases, FIG. 2C shows a change in terminal-to-terminal voltages of the respective storage elements in response to a temporal change in the case that the voltage equalizing operation of the present invention is repeatedly carried out.

In the voltage equalizing circuit of the present invention, since the target value voltage "Vx" connected to the reference voltage winding is present other than the above-explained storage elements "Δ", "□", and "○", if the target voltage is set to be such a voltage which is slightly lower than the upper limit voltage of the storage element as shown in FIG. 2C, then all of the terminal-to-terminal voltages of the storage elements can be converged to this set target voltage in the case that the switching operation is repeatedly carried out.

It should also be noted that the turn numbers of the reference voltage winding Pp and of the plural winding P1 to Pn are not necessarily made equal to each other, but may be arbitrarily set in response to the voltage of the DC power supply Ep.

Figure 3:
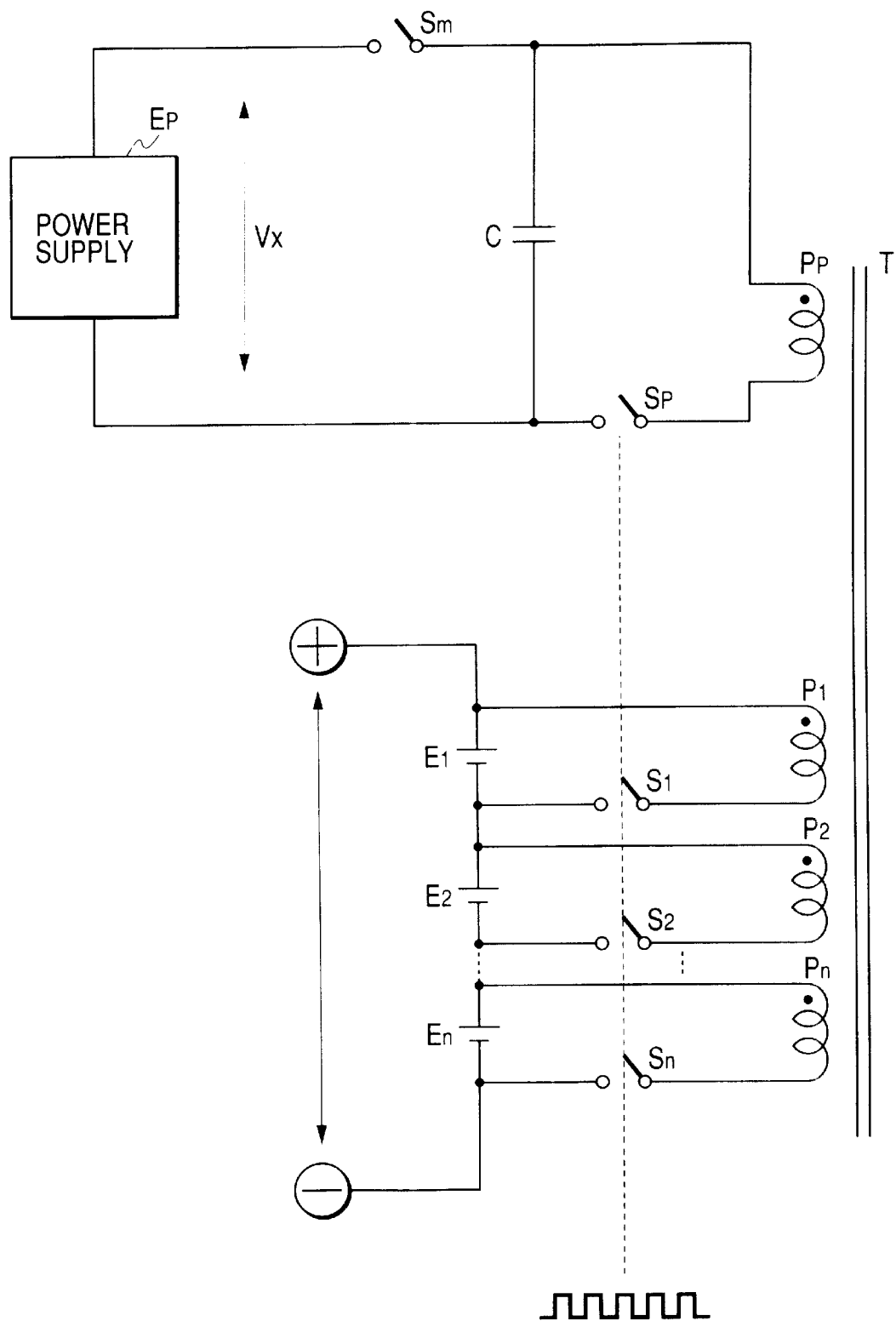
FIG. 3 is a diagram for indicating a circuit arrangement according to a second embodiment of the present invention.

FIG. 3 is a diagram for indicating a voltage equalizing circuit according to a second embodiment of the present invention.

In FIG. 3, reference numerals P1 to Pn show a plurality of windings which are electromagnetically coupled to each other by a transformer T. Reference numerals S1 to Sn indicate a plurality of first switching elements. Reference numbers E1 to En represent storage elements which are series-connected to each other. These storage elements are constituted by such storage elements as batteries, electric double layer capacitors, or the like. Each of these first switching elements S1 to Sn, each of these windings P1 to Pn, and each of these storage elements E1 to En are series-connected to each other, so that a plurality of closed circuits are arranged. Also, series-connecting terminals "+" and "−" of the plural storage elements E1 to En series-connected to each other are connected to an external charging circuit and/or a load.

Also, reference numeral "Pp" shows a reference voltage winding which is electromagnetically coupled via the transformer T to the plural windings P1 to Pn. This reference voltage winding Pp is series-connected via a second switching element Sp and a voltage monitoring switching element Sm to a DC power supply Ep, so that a closed circuit is constituted. Also, a voltage monitoring storage element "C" is series-connected to both the reference voltage winding Pp and the second switching element Sp, so that another closed circuit is constituted. This DC power supply Ep corresponds to a variable DC power supply capable of varying an output voltage Vx.

In the circuit of FIG. 3, the voltage monitoring switching element Sm is turned OFF in such a case that an averaged voltage value of the terminal-to-terminal voltages of the plural series-connected storage elements, whereas this voltage monitoring switching element Sm is turned ON while the voltage equalizing operation is carried out by turning ON/OFF the first switching elements and the second switching element under normal operation. It should be understood that when a measuring operation of an averaged voltage value of the terminal-to-terminal voltages of the storage elements is required, this monitoring switching element is turned OFF, the time period of which may differ, depending upon usage to which the voltage equalizing apparatus is applied. This time period is very longer than the ON/OFF operation periods of both the first switching elements and the second switching element used to equalize the voltages.

In this circuit, when the monitoring switching element Sm is turned OFF, an averaged voltage value of the terminal-to-terminal voltages of the plural series-connected storage elements E1 to En may be detected. This is because of the below-mentioned phenomenon.

That is, when both the first switching elements and the second switching element are turned OFF so as to execute the voltage equalizing operation under such a condition that the monitoring switching element Sm is turned OFF, such a closed circuit made by series-connecting the monitoring storage element C, the second switching element Sp, and the reference voltage winding Pp to each other is made equivalent to the closed circuit constituted by series-connecting the storage elements E1 to En, the first switching elements S1 to Sn, and the windings P1 to Pn to each other. Since the terminal-to-terminal voltages of the plural storage elements E1 to En and the voltage monitoring storage element C are equalized, such an averaged voltage value of the terminal-to-terminal voltages of the plural storage elements E1 to En can be detected by detecting the terminal-to-terminal voltage of the monitoring storage element.

In the circuit of FIG. 3, since the first switching elements S1 to Sn and the second switching element Sp are turned ON/OFF at the same time in response to a signal supplied from a controller (not shown), the below-mentioned action is repeatedly carried out every time the switching elements are turned ON/OFF, so that terminal voltages of the plural storage elements E1 to En, or the terminal voltage of the DC power supply can be equalized. In accordance with this action, within time periods of these switching operations, a discharge current derived from such a storage element having a high terminal voltage among the plural storage elements E1 to En, or the DC power supply may cause a charge current to flow through such a storage element having a low terminal voltage among the plural storage elements E1 to En, or the DC power supply via the transformer T which is electromagnetically coupled to each other. This action is repeatedly carried out every time the switching elements are turned ON/OFF, so that the terminal voltages of the plural storage elements E1 to En, or the DC power supply can be equalized, which is similar to the case of FIG. 1.

In this circuit, when the output voltage of the DC power supply Ep is set to be higher than the averaged voltage of the voltages among the terminals of these plural storage elements E1 to En, the energy is supplied from the DC power supply Ep to these storage elements. As a result, the averaged voltage among the terminals of the plural storage elements can be increased.

Also, contrary to the above-described case, when the output voltage of the DC power supply Ep is set to be lower than the averaged voltage of the voltages among the terminals of these plural storage elements E1 to En, the energy is supplied other than this DC power supply Ep to these storage elements. As a result, the averaged voltage among the terminals of the plural storage elements can be decreased, since this supplied energy may constitute the charge energy with respect to the DC power supply Ep.

The above-explained increasing operation, or decreasing operation of the voltages among the terminals of these storage elements may be carried out by supplying the energy from the DC power supply, or by absorbing the energy by the DC power supply. It is not preferable to increase the current capacity of the switching element, and also to increase the capacity of the DC power supply in view of economical aspects. As a consequence, while a difference between the averaged value of the voltages among the terminals of the plural storage elements and the voltage Vx of the DC power supply is set to be a small value so as to average the voltages, it is so preferable that the output voltage of the DC power supply is varied so as to be converged to the target value.

Figure 4:
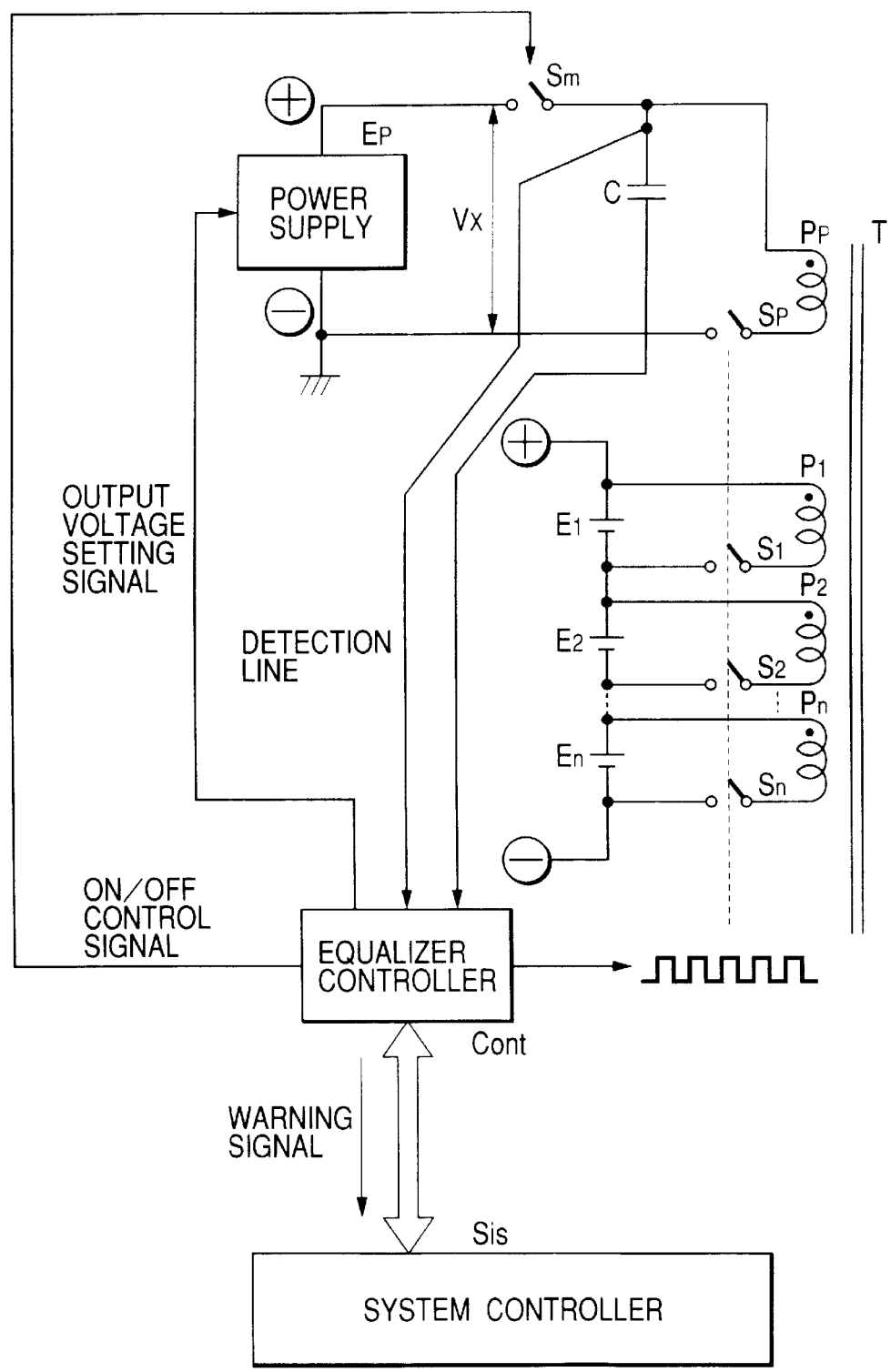
FIG. 4 is a diagram for showing a circuit arrangement according to a third embodiment of the present invention.

FIG. 4 is a diagram for indicating a voltage equalizing circuit according to a third embodiment of the present invention.

In FIG. 4, reference numerals P1 to Pn show a plurality of windings which are electromagnetically coupled to each other by a transformer T. Reference numerals S1 to Sn indicate a plurality of first switching elements. Reference numbers E1 to En represent storage elements which are series-connected to each other. These storage elements are constituted by such storage elements as batteries, electric double layer capacitors, or the like. Each of these first switching elements S1 to Sn, each of these windings P1 to Pn, and each of these storage elements E1 to En are series-connected to each other, so that a plurality of closed circuits are arranged. Also, series-connecting terminals "+" and "−" of the plural storage elements E1 to En series-connected to each other are connected to an external charging circuit and/or a load.

Also, reference numeral "Pp" shows a reference voltage winding which is electromagnetically coupled via the transformer T to the plural windings P1 to Pn. This reference voltage winding Pp is series-connected via a second switching element Sp and a voltage monitoring switching element Sm to a DC power supply Ep, so that a closed circuit is constituted. Also, a voltage monitoring storage element "C" is series-connected to both the reference voltage winding Pp and the second switching element Sp, so that another closed circuit is arranged. This DC power supply Ep corresponds to a variable DC power supply capable of varying an output voltage Vx.

In FIG. 4, symbol "Cont" shows an equalizer controller which may perform an equalizing operation of a voltage equalizing circuit according to the present invention, may send a warning signal, and also may transmit/receive a signal to/from a system controller "Sis" corresponding to an upper-grade apparatus. This equalizer controller Cont executes the below-mentioned control operations.

That is, in response to a pulse signal supplied from the above-explained equalizer controller Cont, both the first switching elements S1 to Sn and the second switching element Sp are turned ON/OFF in a periodic manner in order to equalize the terminal-to-terminal voltages of the plural storage elements E1 to En which are series-connected to each other.

Also, in response to an ON/OFF control signal supplied from the equalizer controller Cont, since the terminal-to-terminal voltage of the monitoring storage element is detected under such a condition that the monitoring switching element Sm is turned OFF, an averaged voltage of the terminal-to-terminal voltages of the plural storage elements E1 to En is detected. As a result of this averaged voltage detection, when the averaged terminal-to-terminal voltage of the plural storage elements E1 to En may become higher than, or lower than a predetermined voltage, this equalizer controller Cont outputs the warning signal with respect to the system controller "Sis", and also judges that certain malfunction occurs in the voltage equalizer apparatus. As a result, this equalizer controller Cont stops to send the pulse signal with respect to both the first switching elements S1 to Sn and the second switching element Sp in order to stop the equalizing operation.

Also, in the case that the voltage of the DC power supply is varied in response to an output voltage control signal supplied from the equalizer controller Cont, since the above-explained increasing operation, or decreasing operation of the voltages among the terminals of these storage elements may be carried out by supplying the energy from the DC power supply, or by absorbing the energy by the DC power supply, it is not preferable to increase the current capacity of the switching element, and also to increase the capacity of the DC power supply in view of economical aspects. As a consequence, while a difference between the averaged value of the voltages among the terminals of the plural storage elements and the voltage Vx of the DC power supply is set to be a very small value so as to average the voltages, it is so preferable that the output voltage of the DC power supply is varied so as to be converged to the target value.

Also, the system controller "Sis" which transmits/receives the various sorts of signals derived from the equalizer controller Cont may transmit/receive such a control signal with respect to an energy-hybrid vehicle, a system house, an unmanned relay/observation apparatus, which are not shown in this drawing.

Figure 5:
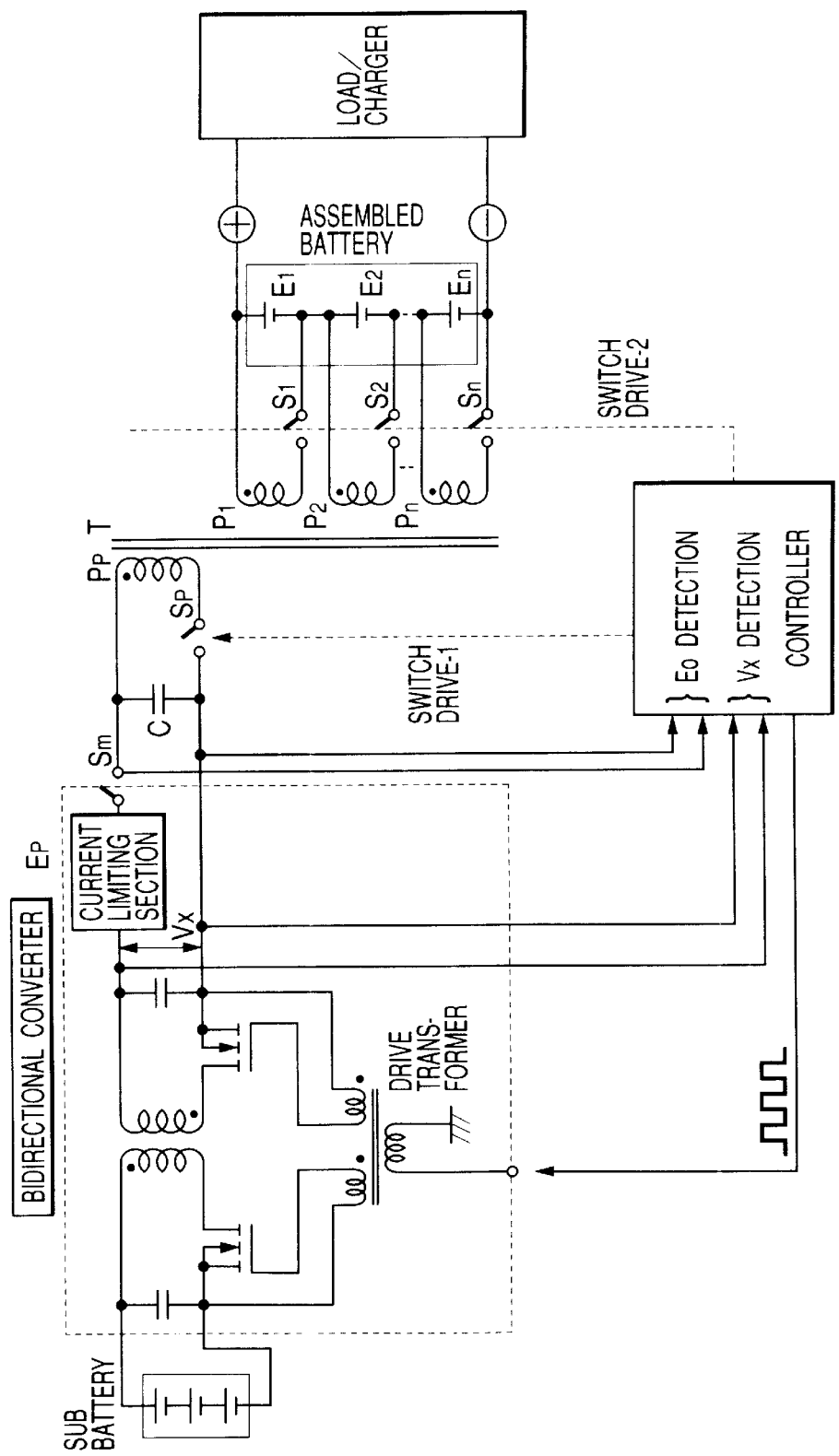
FIG. 5 is a diagram for indicating a circuit arrangement according to a fourth embodiment of the present invention.

FIG. 5 is a diagram for indicating a voltage equalizing circuit according to a fourth embodiment of the present invention.

In FIG. 5, reference numerals P1 to Pn show a plurality of windings which are electromagnetically coupled to each other by a transformer T. Reference numerals S1 to Sn indicate a plurality of first switching elements. Reference numbers E1 to En represent storage elements which are series-connected to each other. These storage elements are constituted by such storage elements as batteries, electric double layer capacitors, or the like. Each of these first switching elements S1 to Sn, each of these windings P1 to Pn, and each of these storage elements E1 to En are series-connected to each other, so that a plurality of closed circuits are arranged. Also, series-connecting terminals "+" and "−" of the plural storage elements E1 to En series-connected to each other are connected to an external charging circuit and/or a load.

Also, reference numeral "Pp" shows a reference voltage winding which is electromagnetically coupled via the transformer T to the plural windings P1 to Pn. This reference voltage winding Pp is series-connected via a second switching element Sp and a voltage monitoring switching element Sm to a DC power supply Ep, so that a closed circuit is constituted. Also, a voltage monitoring storage element "C" is series-connected to both the reference voltage winding Pp and the second switching element Sp, so that another closed circuit is constituted. This DC power supply Ep corresponds to a variable DC power supply capable of varying an output voltage Vx.

In the circuit of FIG. 5, an arrangement of the DC power supply Ep is represented in detail.

In FIG. 5, either a load or a charging device is connected between the series-connecting terminals "+" and "−" of the plural storage capacitors which are series-connected to each other.

Also, the DC power supply is arranged by a bidirectional converter, a sub-battery which is connected as a power supply of this bidirectional converter, a current limiting section, and also a drive transformer.

With employment of this arrangement, since the bidirectional converter is turned ON/OFF in response to a control signal supplied from an equalizer controller, this bidirectional converter can freely control an output voltage on the side of the reference voltage winding of the bidirectional converter, and also can absorb such energy supplied from the plural series-connected storage elements E1 to En in such away that this absorbed energy is used to charge the sub-battery (since energy is absorbed, averaged terminal-to-terminal voltage of plural series-connected storage elements may be lowered to a predetermined voltage value).

Figure 6:
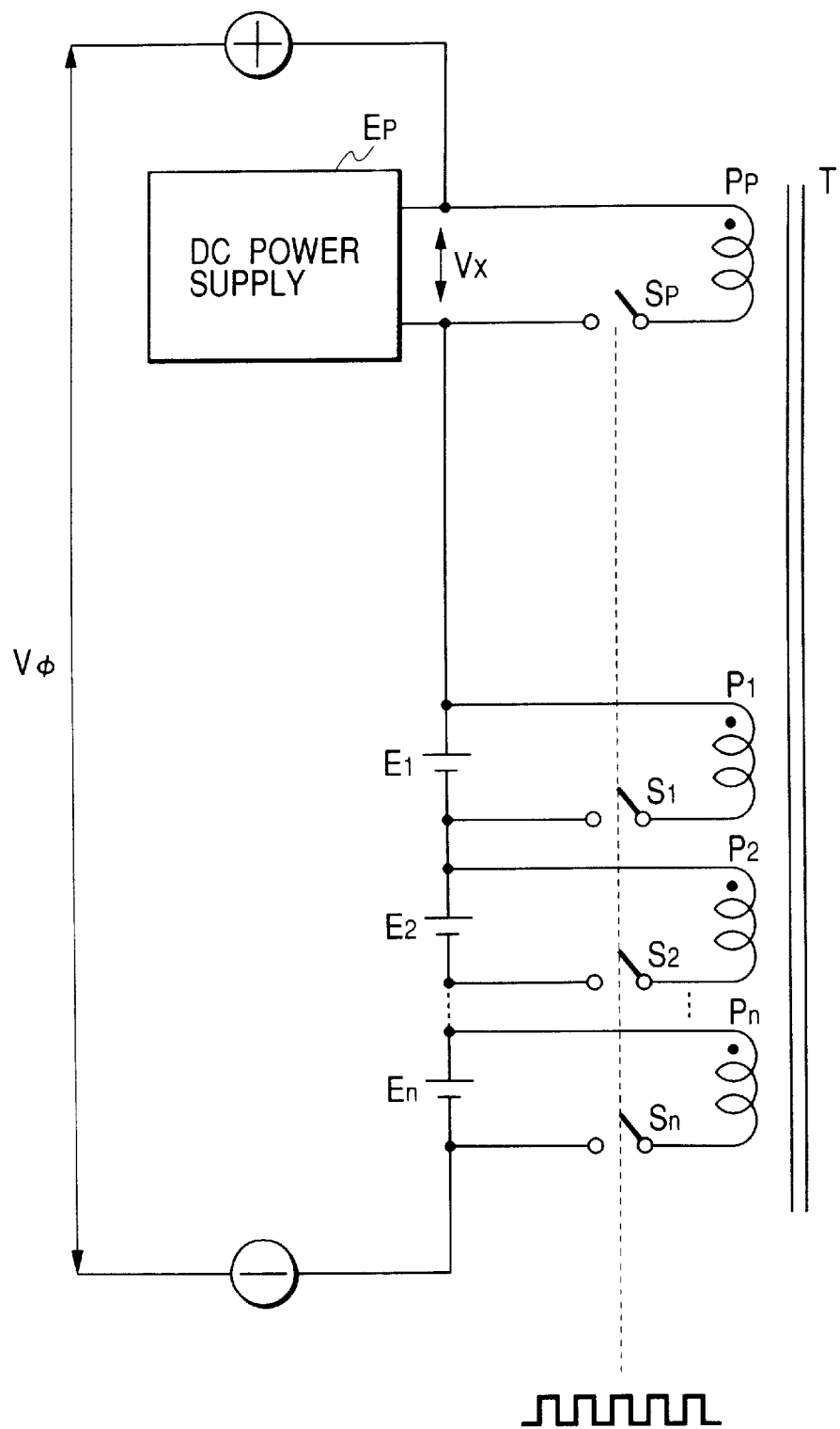
FIG. 6 is a diagram for showing a circuit arrangement according to a fifth embodiment of the present invention.

FIG. 6 is a diagram for indicating a voltage equalizing circuit according to a fifth embodiment of the present invention.

In FIG. 6, reference numerals P1 to Pn show a plurality of windings which are electromagnetically coupled to each other by a transformer T. Reference numerals S1 to Sn indicate a plurality of first switching elements. Reference numbers E1 to En represent storage elements which are series-connected to each other. These storage elements are constituted by such storage elements as batteries, electric double layer capacitors, or the like. Each of these first switching elements S1 to Sn, each of these windings P1 to Pn, and each of these storage elements E1 to En are series-connected to each other, so that a plurality of closed circuits are arranged.

Also, reference numeral "Pp" shows a reference voltage winding which is electromagnetically coupled via the transformer T to the plural windings P1 to Pn. This reference voltage winding Pp is series-connected via a second switching element Sp to a DC power supply Ep, so that a closed circuit is constituted.

This embodiment is featured by that the plurality of series-connected storage elements are connected in series to the above-explained DC power supply.

Then, similar to FIG. 1, an external charging circuit and/or a load (not shown) are connected between series-connected terminals "+" and "−."

With employment of such an arrangement, flexibility of applications of systems can be increased.

Figure 7:
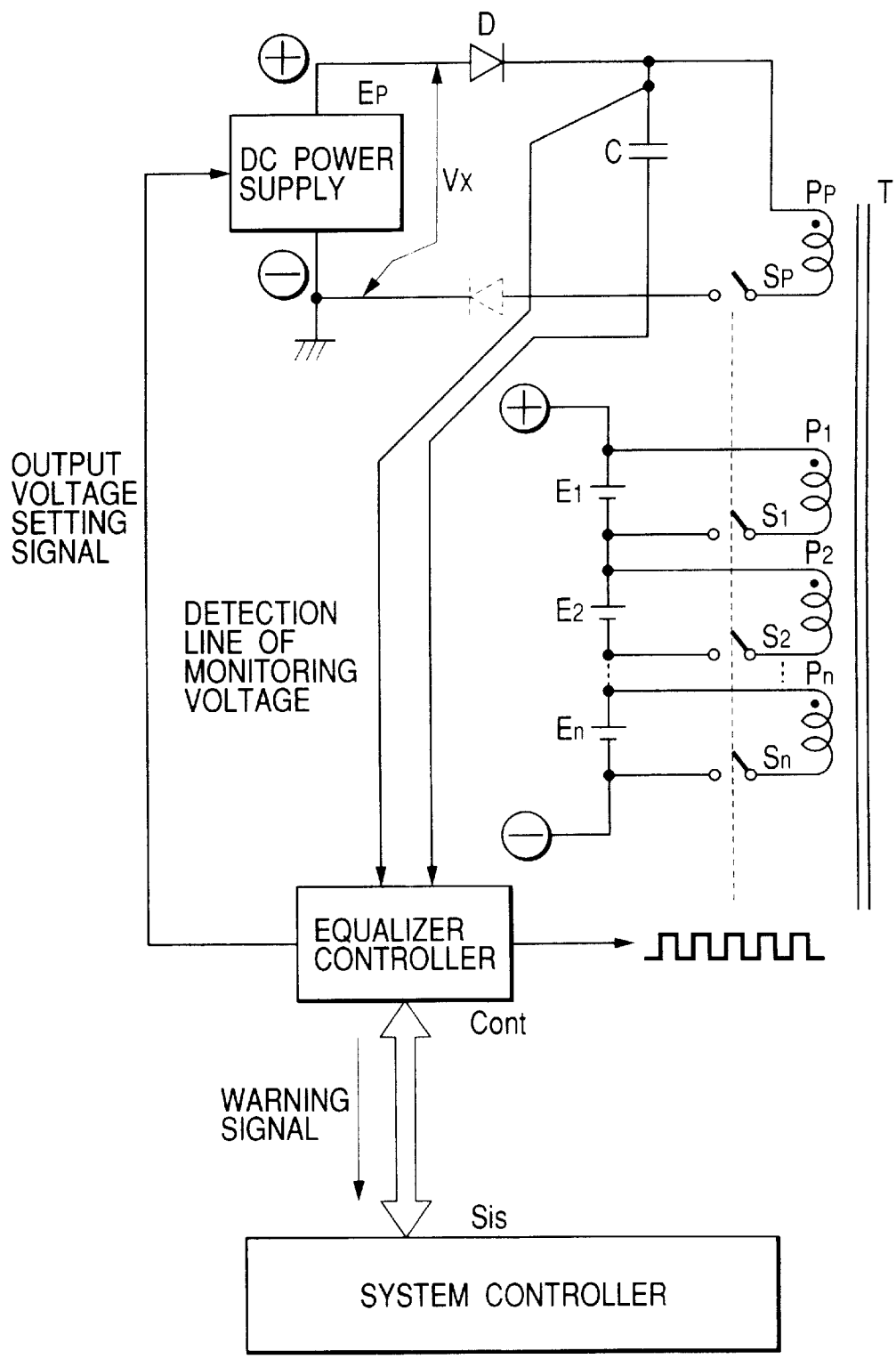
FIG. 7 is a diagram for indicating a circuit arrangement according to a sixth embodiment of the present invention.
Figure 8:
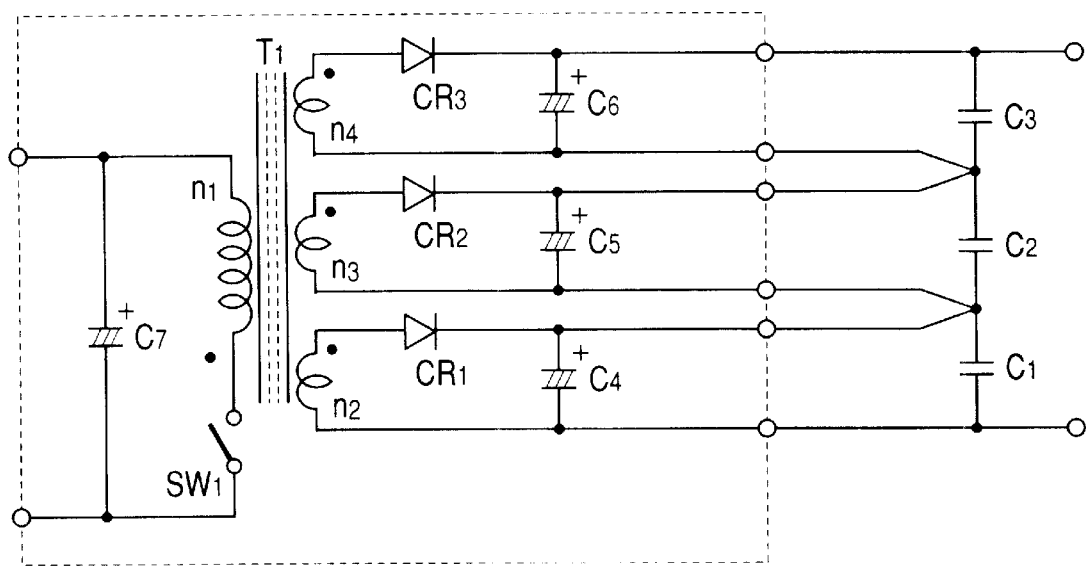
FIG. 8 is a diagram for showing the conventional flyback type equalizer circuit.
Figure 9:
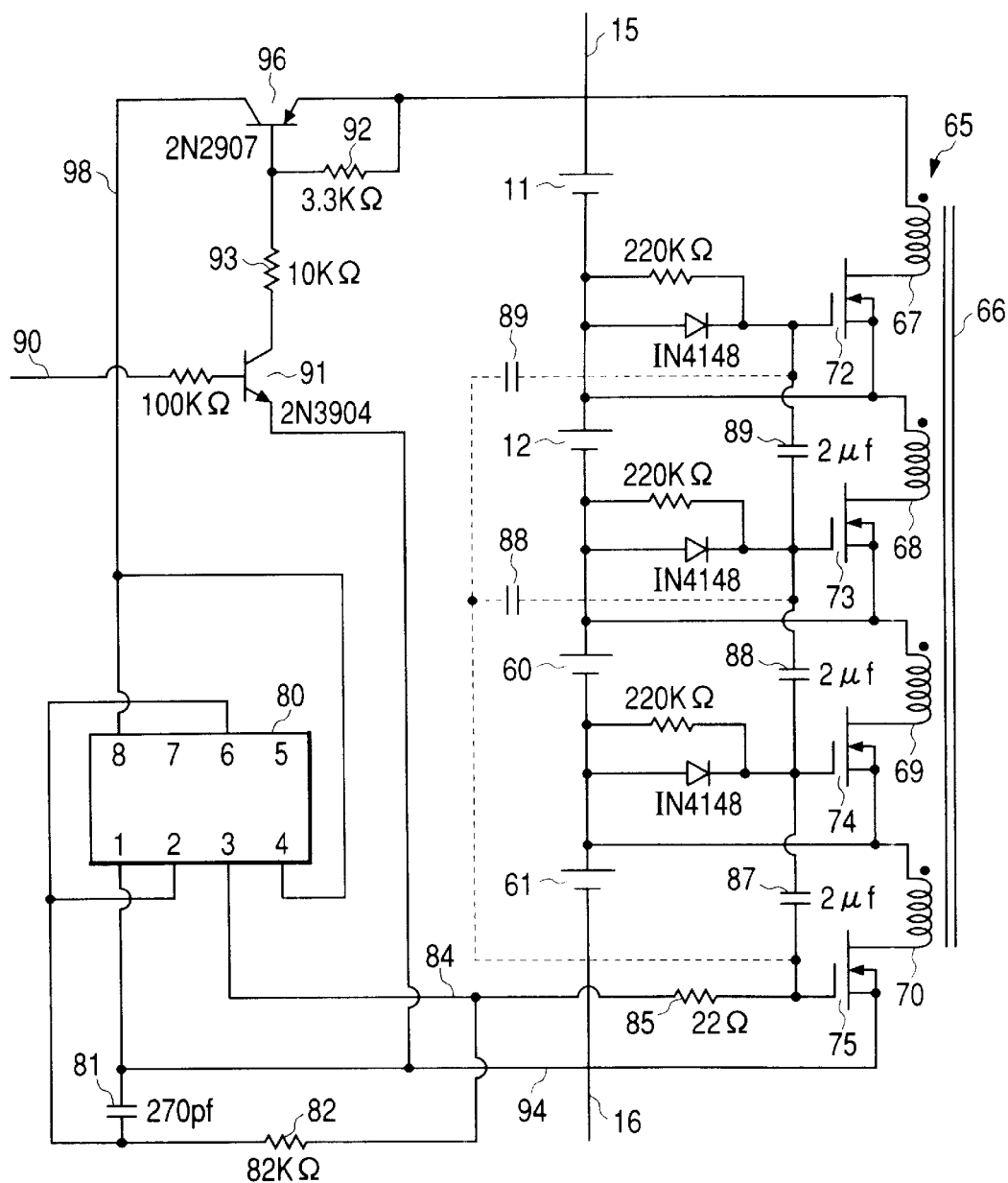
FIG. 9 is a diagram for indicating the conventional forward type equalizer circuit.

FIG. 7 is a diagram for indicating a voltage equalizing circuit according to a sixth embodiment of the present invention.

In FIG. 7, reference numerals P1 to Pn show a plurality of windings which are electromagnetically coupled to each other by a transformer T. Reference numerals S1 to Sn indicate a plurality of first switching elements. Reference numbers E1 to En represent storage elements which are series-connected to each other. These storage elements are constituted by such storage elements as batteries, electric double layer capacitors, or the like. Each of these first switching elements S1 to Sn, each of these windings P1 to Pn, and each of these storage elements E1 to En are series-connected to each other, so that a plurality of closed circuits are arranged. Also, series-connecting terminals "+" and "−" of the plural storage elements E1 to En series-connected to each other are connected to an external charging circuit and/or a load.

Also, reference numeral "Pp" shows a reference voltage winding which is electromagnetically coupled via the transformer T to the plural windings P1 to Pn. This reference voltage winding Pp is series-connected via a second switching element Sp to a DC power supply Ep, so that a closed circuit is constituted. Also, a voltage monitoring storage element "C" is series-connected to both the reference voltage winding Pp and the second switching element Sp, so that another closed circuit is constituted. This DC power supply Ep corresponds to a variable DC power supply capable of varying an output voltage Vx.

This embodiment is featured by that a diode "D" is series-connected between the DC power supply and the monitoring storage element.

As apparent from the foregoing description, the connection position of the diode may be replaced by such a position where the diode is indicated by a dotted line in FIG. 7.

Since this diode D is present, this diode D is biased along the forward direction in the case that the voltage of the DC power supply becomes higher than the terminal-to-terminal voltage of the monitoring storage element. As a result, since such a circuit arrangement is constituted by that all of the first plural switching elements and also of the second switching element are turned ON/OFF in a synchronous manner, the voltage equalizer apparatus can be simplified in such a usage case that the energy is extracted from the plural series-connected storage elements to the side of the DC power supply.

As to a monitor function of a terminal-to-terminal voltage of the monitoring storage element in this case, in such a case that the terminal-to-terminal voltage of the monitoring storage element is higher than the terminal-to-terminal of the DC power supply Ep (namely, in case that terminal-to-terminal voltages of plural series-connected storage elements is higher than terminal-to-terminal voltage of DC power supply Ep due to charging operation by external charging device, generator, and the like, which are not shown), no current flows through the diode. As a consequence, since this terminal-to-terminal voltage of the monitoring storage element represents the terminal-to-terminal voltages of the plural series-connected storage elements, the monitoring operation may be carried out by measuring this terminal-to-terminal voltage.

In accordance with the invention, in such a voltage equalizer apparatus in which each of plural windings electromagnetically coupled to each other, each of plural storage elements series-connected to each other, and each of plural first switching elements are connected to each other in a series connecting manner so as to constitute a plurality of closed circuits, a reference voltage winding electromagnetically coupled to the plurality of windings is provided; both a DC power supply and a second switching element are series-connected to the reference voltage winding; and all of the plural first switching elements and the second switching element are turned ON/OFF in a synchronous manner. As a consequence, since all of the terminal-to-terminal voltages of the storage elements are converged to the voltage of the DC power supply, the terminal-to-terminal voltages of the plural storage elements which are series-connected to each other can be converged to a final target value without risks of overcharging operation and overdischarging operation with respect to the storage elements, while performing the voltage equalizing operation.

Also, according to the invention, while the plural series-connected storage elements are series-connected to the DC power supply so as to constitute the voltage equalizer apparatus, the overall DC output may be connected to both an external power supply and an external load, and the voltage equalizer apparatus may be effectively used to operate the system.

Also, according to the invention, since the output voltage of the DC power supply is variable, not only the terminal-to-terminal voltages of the plural series-connected storage elements can be merely averaged, but also these terminal-to-terminal voltages can be converged to an arbitrary voltage in response to setting of the voltage of the DC power supply while performing the averaging operation. Also, according to the invention, the DC power supply owns a bidirectional characteristic and is provided with an apparatus capable of supplying electric power to the plurality of series-connected storage elements, and also, capable of absorbing electric power supplied from the plurality of series-connected storage elements. As a result, the terminal-to-terminal voltages of the plural series-connected storage elements may be made lower than the present voltages in a simple manner.

Also, according to the invention, the voltage equalizer circuit comprises a voltage detecting section for detecting voltages among terminals of the plurality of series-connected storage elements; and the voltage of the DC power supply is set in response to an averaged terminal-to-terminal voltage of the storage elements, which is calculated from the voltage detecting section. As a result, since the terminal-to-terminal voltages of the storage elements can be gradually increased, the terminal-to-terminal voltages of the plural series-connected storage elements can be converged to the final target value without increasing the current capacities of the switching elements and also the capacity of the DC power supply, while employing a switching element having a small capacity and a DC power supply having a small capacity.

Also, according to the invention, the output voltage of the DC power supply is set between an allowable maximum voltage and an allowable minimum voltage, which are determined based upon a material of the storage element. As a result, the terminal-to-terminal voltages can be converged to the final target value, while neither a specifically-designed abnormal voltage detecting circuit, nor a protection circuit is provided with respect to the plural series-connected storage elements. Also, it is possible to avoid short lifetime of the storage elements, and furthermore, to avoid destroys of these storage elements due to heat radiation.

Also, in accordance with the invention, in such a voltage equalizer circuit in which each of plural windings electromagnetically coupled to each other, each of plural storage elements series-connected to each other, and each of plural first switching elements are connected to each other in a series connecting manner so as to constitute a plurality of closed circuits, a reference voltage winding electromagnetically coupled to the plurality of windings is provided; both a DC power supply and a second switching element are series-connected to the reference voltage winding; a third switching element is provided so as to connect a monitoring storage element between series-connecting terminals of the reference voltage winding and the second switching element, and also so as to interrupt the connection between the DC power supply and the monitoring storage element; all of the plural first switching elements and the second switching element are turned ON/OFF in a synchronous manner; and the third switching element is turned OFF when a voltage between terminals of the monitoring storage element is monitored. As a result, an averaged terminal-to-terminal voltage of the plural series-connected storage elements can be readily detected by being acquired by the equalizer controller.

Also, in accordance with the invention, while the plural series-connected storage elements are series-connected to the DC power supply so as to constitute the voltage equalizer apparatus, the overall DC output may be connected to both an external power supply and an external load, and the voltage equalizer apparatus may be effectively used to operate the system.

Also, according to the invention, since the DC power supply is capable of varying the voltage, the voltage of the DC power supply can be properly varied by using the detected averaged terminal-to-terminal voltage of the monitoring storage element. As a result, for instance, the terminal-to-terminal voltage of the plural series-connected storage elements can be converged to an arbitrary voltage by the equalizer controller without giving a load to the switching element.

Also, according to the invention, the DC power supply owns a bidirectional characteristic and is provided with an apparatus capable of supplying electric power to the plurality of series-connected storage elements, and also, capable of absorbing electric power supplied from the plurality of series-connected storage elements. As a result, in the case that the voltage of the DC power supply is set to be such a voltage lower than the detected averaged terminal-to-terminal voltage of the plural storage elements, the energy supplied from the plural storage elements is consumed on the side of the DC power supply, and thus the voltage of the DC power supply is continuously maintained at a low voltage. As a consequence, the terminal-to-terminal voltages of the plural series-connected storage elements can be converged to an arbitrary low voltage.

Also, according to the invention, the voltage equalizer circuit comprises a voltage detecting section for detecting a voltage between terminals of the monitoring storage element; and the voltage of the DC power supply is set in response to a detected voltage at this time by the equalizer control, while the averaged terminal-to-terminal voltage of the storage elements, which is calculated by the voltage detecting section, is supplied to this equalizer controller. As a result, the voltage of the DC power supply can be properly set in correspondence with the current capacity of the switching element and the capability of the DC power supply.

Also, according to the invention, the output voltage of the DC power supply is set between an allowable maximum voltage and an allowable minimum voltage, which are determined based upon a material of the storage element. As a consequence, since a voltage applied to a storage element is limited between an allowable maximum voltage and an allowable minimum voltage, which are determined in accordance with a material and the like of this storage element, the terminal-to-terminal voltages can be converged to the final target value, while neither a specifically-designed abnormal voltage detecting circuit, nor a protection circuit is provided with respect to the plural series-connected storage elements. Also, it is possible to avoid short lifetime of the storage elements, and furthermore, to avoid destroys of these storage elements due to heat radiation.

Also, according to the invention, in the case that a voltage between the terminals of the monitoring storage element during OFF time period of the third switching element exceeds a predetermined voltage, an external charging operation with respect to the plurality of series-connected storage elements is stopped and/or a warning notice is issued. As a result, such a fact that a voltage applied to a storage element is increased higher than, or equal to an overcharging voltage determined in accordance with the material of this storage element is notified to an operator, and furthermore, the equalizing operation is stopped, which can avoid that the voltage applied to the storage element is furthermore increased higher than the overcharging voltage, the lifetime of the storage elements is shortened, and also the storage elements are destroyed due to heat radiation of these storage elements.

Also, according to the invention, in the case that a voltage between the terminals of the monitoring storage element during OFF time period of the third switching element becomes lower than, or equal to a predetermined voltage, ON/OFF operations of the first switching elements and the second switching element are stopped and/or a warning notice is issued. As a result, for instance, such a fact that a voltage applied to a storage element is approximated to a discharge end voltage determined based upon the material of this storage element is notified to an operator, and the equalizing operation is stopped, which can avoid that the voltage applied to the storage element is furthermore decreased lower than the discharge end voltage, and also, the lifetime of the storage elements is shortened because the terminal-to-terminal voltages of these storage elements become lower than, or equal to the final discharge voltage.

Also, according to the invention, since the storage elements and/or the voltage monitoring storage element are electric double layer capacitors, such a capacitor having a large capacitance may be employed instead of a battery. In particular, when the electric double layer capacitor is applied to the voltage monitoring storage element, since this electric double layer capacitor owns the large capacity, this capacitor can detect the voltage under stable condition.

Also, in accordance with the invention, since the third switching element is constituted by the relay, the timing at which this relay is turned OFF can be easily controlled by the equalizer controller in order to detect the terminal-to-terminal voltage of the storage elements.

Also, in accordance with the invention, in such a voltage equalizer circuit in which each of plural windings electromagnetically coupled to each other, each of plural storage elements series-connected to each other, and each of plural first switching elements are connected to each other in a series connecting manner so as to constitute a plurality of closed circuits, a reference voltage winding electromagnetically coupled to the plurality of windings is provided; both a DC power supply and a second switching element are series-connected to the reference voltage winding; a monitoring storage element is connected between series-connection terminals of the reference voltage winding and the second switching element; and a diode is provided which is biased along a forward direction in such a case that the voltage of the DC power supply is higher than a voltage between terminals of the monitoring storage element, so that the diode supplies a current to the reference voltage winding; and further, all of the plural first switching elements and the second switching element are turned ON/OFF in a synchronous manner. As a consequence, the voltage equalizing apparatus can be made simple in such a use case that the energy need not be extracted from the plural series-connected storage elements to the side of the DC power supply.

Also, according to the invention, while the plural series-connected storage elements are series-connected to the DC power supply so as to constitute the voltage equalizer apparatus, the overall DC output may be connected to both an external power supply and an external load, and also the flexibility in operations of the systems can be improved.

Also, according to the invention, a voltage equalizer circuit of a storage element is featured by that at least a plurality of closed circuits in which each of plural windings electromagnetically coupled to each other, each of plural storage elements series-connected to each other, and each of plural first switching elements are connected to each other in a series connecting manner; while a reference voltage winding electromagnetically coupled to the plurality of windings, another closed circuit constituted by the reference voltage winding, a DC power supply, and a second switching element; and a controller for turning ON/OFF all of the first switching elements and the second switching element in a synchronous manner are formed in an integral body of a module. As a result, both a voltage and a current of a single module can be set as rated values. Since a plurality of modules are used, such a system having an arbitrary voltage and an arbitrary current capacity can be readily arranged.

Also, according to the invention, the DC power supply is constituted by a bidirectional converter; one of input/output terminals of the bidirectional converter is connected to the monitoring storage element; and the other of the input/output terminals of the bidirectional converter is connected to a battery. As a result, while the voltage of the DC power supply is changed in order that the terminal-to-terminal voltages of the plural series-connected storage elements can be freely changed higher/lower than the present voltage, in particular, in the case that the voltage of the DC power supply is changed so as to lower the terminal-to-terminal voltages of the plural series-connected storage elements than the present voltages, since the energy can be easily absorbed (consumed), such a system capable of especially realizing the effective control can be obtained.

Also, in accordance with the invention, since the plurality of storage elements are arranged by that storage elements having a plurality of charging/discharging characteristics different from each other are connected in a parallel connecting manner, it is possible to supply such currents suitable for load characteristics in transient states while the charging operation and the discharging operation are carried out.

In other words, when the transient current is large during either the charging operation or the discharging operation, the electric double layer capacitor having the small internal resistance value and capable of supplying the large current may effectively function. Thereafter, the battery having the large internal resistance value and capable of hardly supplying the large current may supply the current, and thus may effectively function since these electric double layer capacitor and battery are combined with each other, the respective merits thereof may be utilized.

Also, in accordance with the invention, in such a voltage equalizer apparatus of a storage element in which each of plural windings electromagnetically coupled to each other, each of plural storage elements series-connected to each other, and each of plural first switching elements are connected to each other in a series connecting manner so as to constitute a plurality of closed circuits; a reference voltage winding electromagnetically coupled to the plurality of windings is provided; both a DC power supply and a second switching element are series-connected to the reference voltage winding; a third switching element is provided so as to connect a monitoring storage element between series-connection terminals of the reference voltage winding and the second switching element, and also so as to interrupt the connection between the DC power supply and the monitoring storage element; all of the plural first switching elements and the second switching element are turned ON/OFF in a synchronous manner; and the third switching element is turned OFF when a voltage between terminals of the monitoring storage element is monitored, when a voltage between terminals of the storage element becomes such a value different from a target value by a predetermined voltage, or a higher voltage thereof, the plurality of storage elements are rapidly charged up to a predetermined charge voltage by a charging operation of an external power supply; and thereafter, both the first switching elements and the second switching element are turned ON/OFF so as to control the terminal-to-terminal voltage of the storage element to be equal to the target value. As a consequence, in the case that the terminal-to-terminal voltage of the storage element is low in such a case as when a system is initiated, and also this voltage becomes the value different from the target value by a predetermined voltage, since the capacity of this storage element is larger, after this storage element is quickly charged by the external power supply to the target value, the equalizing operation is commenced, resulting in a rational charging operation.

Also, according to the invention, in such a voltage equalizing apparatus of a storage element in which each of plural windings electromagnetically coupled to each other, each of plural storage elements series-connected to each other, and each of plural first switching elements are connected to each other in a series connecting manner so as to constitute a plurality of closed circuits; a reference voltage winding electromagnetically coupled to the plurality of windings is provided; both a DC power supply and a second switching element are series-connected to the reference voltage winding; a third switching element is provided so as to connect a monitoring storage element between series-connection terminals of the reference voltage winding and the second switching element, and also so as to interrupt the connection between the DC power supply and the monitoring storage element; all of the plural first switching elements and the second switching element are turned ON/OFF in a synchronous manner; and the third switching element is turned OFF when a voltage between terminals of the monitoring storage element is monitored, when a voltage between terminals of the storage element becomes such a value different from a target value by a predetermined voltage, or a higher voltage thereof, the voltage of the DC power supply is set to such a voltage on the side of the target value and also in the vicinity of an averaged voltage of the monitored storage element; and while both the first switching elements and the second switching element are turned ON/OFF, a control operation is carried out in such a manner that the voltage of the DC power supply is gradually approximated to the target value. As a result, the terminal-to-terminal voltage of the storage element can be changed by a proper changing manner without any risk in correspondence with the current capacity of the switching element and also the performance of the DC power supply, while both the current capacity of the switching element and the capacity of the DC power supply are not increased.

What is claimed is:

1. A voltage equalizer comprising:
    a plurality of first windings electromagnetically coupled to each other;
    a plurality of storage elements series-connected to each other;
    a plurality of first switching elements, each connected to one of the first windings and one of the storage elements to constitute a closed circuit;
    a second winding electromagnetically coupled to the first windings;
    a second switching element series-connected to the second winding; and
    a DC power supply series-connected to the second winding and the second switching element, the DC power supply for applying reference voltage to the second winding,
    wherein all of the first switching elements and the second switching element are turned ON/OFF in synchronous.

2. The voltage equalizer as claimed in claim 1, wherein the storage elements are series-connected to the DC power supply.

3. The voltage equalizer as claimed in claim 2, wherein the DC power supply supplies electric power to the storage elements, and absorbs electric power supplied from the storage elements.

4. The voltage equalizer as claimed in claim 1 wherein the DC power supply is variable in voltage.

5. The voltage equalizer as claimed in claim 1, further comprising a voltage detecting section for detecting voltages among the storage elements, the voltage detecting section for calculating an averaged terminal-to-terminal voltage of the storage elements,
    wherein the DC power supply sets output voltage according to the averaged terminal-to-terminal voltage.

6. The voltage equalizer as claimed in claim 1, wherein the DC power supply outputs voltage between an allowable maximum voltage and an allowable minimum voltage both determined based upon material of the storage elements.

7. The voltage equalizer as claimed in claim 1, wherein the storage elements and/or the voltage monitoring storage element are electric double layer capacitors.

8. The voltage equalizer as claimed in claim 1, wherein each of the plurality of storage elements includes a plurality of internal storage elements having charging/discharging characteristics different from each other and being connected in parallel.

9. A voltage equalizer comprising:
a plurality of first windings electromagnetically coupled to each other;
a plurality of storage elements series-connected to each other;
a plurality of first switching elements, each connected to one of the first windings and one of the storage elements to constitute a closed circuit;
a second winding electromagnetically coupled to the first windings;
a second switching element series-connected to the second winding;
a DC power supply series-connected to the second winding and the second switching element, the DC power supply for applying reference voltage to the second winding;
a monitoring storage element connected between the second winding and the second switching element; and
a third switching element connected between the DC power supply and the monitoring storage element,
wherein all of the first switching elements and the second switching element are turned ON/OFF in synchronous; and
the third switching element is turned OFF when voltage between terminals of the monitoring storage element is monitored.

10. The voltage equalizer as claimed in claim 9, wherein the storage elements are series-connected to the DC power supply.

11. The voltage equalizer as claimed in claim 10, wherein the DC power supply supplies electric power to the storage elements, and absorbs electric power supplied from the storage elements.

12. The voltage equalizer as claimed in claim 9, wherein the DC power supply is variable in voltage.

13. The voltage equalizer as claimed in claim 9, further comprising a voltage detecting section for detecting a monitored voltage between the terminals of the monitoring storage element, the voltage detecting section obtains an averaged terminal-to-terminal voltage of the storage elements according to the monitored voltage,
wherein the DC power supply sets output voltage according to the averaged terminal-to-terminal voltage of the storage elements.

14. The voltage equalizer as claimed in claim 9, wherein the DC power supply outputs voltage between an allowable maximum voltage and an allowable minimum voltage both determined based upon material of the storage elements.

15. The voltage equalizer as claimed in claim 9 wherein an external charging operation with respect to the storage elements is stopped and/or a warning notice is issued, when the voltage between the terminals of the monitoring storage element during OFF time period of the third switching element exceeds a predetermined voltage.

16. The voltage equalizer as claimed in claim 9, wherein ON/OFF operations of the first switching elements and the second switching element are stopped and/or a warning notice is issued, when the voltage between the terminals of the monitoring storage element during OFF time period of the third switching element becomes lower than, or equal to a predetermined voltage.

17. The voltage equalizer as claimed in claim 9, wherein the storage elements and/or the voltage monitoring storage element are electric double layer capacitors.

18. The voltage equalizer as claimed in claim 9, wherein a relay constitutes the third switching element.

19. The voltage equalizer as claimed in claim 9 wherein the DC power supply includes a bidirectional converter having a first input/output terminal connected to the monitoring storage element, and a second input/output terminal connected to a battery.

20. The voltage equalizer as claimed in claim 9, wherein each of the plurality of storage elements includes a plurality of internal storage elements having charging/discharging characteristics different from each other and being connected in parallel.

21. A voltage equalizer comprising:
a plurality of first windings electromagnetically coupled to each other;
a plurality of storage elements series-connected to each other;
a plurality of first switching elements, each connected to one of the first windings and one of the storage elements to constitute a closed circuit;
a second winding electromagnetically coupled to the first windings;
a second switching element series-connected to the second winding;
a DC power supply series-connected to the second winding and the second switching element, the DC power supply for applying reference voltage to the second winding;
a monitoring storage element connected between the second winding and the second switching element; and
a diode biased along a forward direction to supply a current to the second winding if the voltage of the DC power supply is higher than a voltage between terminals of the monitoring storage element;
wherein all of the first switching elements and the second switching element are turned ON/OFF in synchronous.

22. The voltage equalizer as claimed in claim 21, wherein the storage elements are connected in series to the DC power supply.

23. The voltage equalizer as claimed in claim 21 wherein the DC power supply includes a bidirectional converter having a first input/output terminal connected to the monitoring storage element, and a second input/output terminal connected to a battery.

24. The voltage equalizer as claimed in claim 21, wherein each of the plurality of storage elements includes a plurality of internal storage elements having charging/discharging characteristics different from each other and being connected in parallel.

25. A voltage equalizer comprising:
a plurality of first windings electromagnetically coupled to each other;
a plurality of storage elements series-connected to each other;
a plurality of first switching elements, each connected to one of the first windings and one of the storage elements to constitute a closed circuit;
a second winding electromagnetically coupled to the first windings;
a second switching element series-connected to the second winding;
a DC power supply series-connected to the second winding and the second switching element, the DC power supply for applying reference voltage to the second winding; and a controller for turning ON/OFF all of the first switching elements and the second switching element in synchronous.

26. The voltage equalizer of a storage element as claimed in claim 25, wherein each of the plurality of storage elements includes a plurality of internal storage elements having charging/discharging characteristics different from each other and being connected in a parallel.

27. A voltage equalizing method for a voltage equalizer including a plurality of first windings electromagnetically coupled to each other;
   a plurality of storage elements series-connected to each other;
   a plurality of first switching elements, each connected to one of the first windings and one of the storage elements to constitute a closed circuit;
   a second winding electromagnetically coupled to the first windings;
   a second switching element series-connected to the second winding;
   a DC power supply series-connected to the second winding and the second switching element, the DC power supply for applying reference voltage to the second winding;
   a monitoring storage element connected between the second winding and the second switching element;
   and a third switching element connected between the DC power supply and the monitoring storage element, wherein all of the first switching elements and the second switching element are turned ON/OFF in synchronous;
   and the third switching element is turned OFF when voltage between terminals of the monitoring storage element is monitored,
   the voltage equalizing method comprising:
      charging the plurality of storage elements rapidly up to a predetermined charge voltage by a charging operation of an external power supply when a voltage between terminals of the storage elements is different from a target value by a predetermined voltage, or a higher voltage thereof; and
      turning both the first switching elements and the second switching element ON/OFF to control a terminal-to-terminal voltage of the storage elements to be equal to the target value.

28. A voltage equalizing method for a voltage equalizer including a plurality of first windings electromagnetically coupled to each other;
   a plurality of storage elements series-connected to each other;
   a plurality of first switching elements, each connected to one of the first windings and one of the storage elements to constitute a closed circuit;
   a second winding electromagnetically coupled to the first windings;
   a second switching element series-connected to the second winding;
   a DC power supply series-connected to the second winding and the second switching element, the DC power supply for applying reference voltage to the second winding;
   a monitoring storage element connected between the second winding and the second switching element; and
   a third switching element connected between the DC power supply and the monitoring storage element, wherein all of the first switching elements and the second switching element are turned ON/OFF in synchronous; and
   the third switching element is turned OFF when voltage between terminals of the monitoring storage element is monitored,
   the voltage equalizing method comprising:
      setting the voltage of the DC power supply to a voltage on the side of the target value and in the vicinity of a voltage of the monitoring storage element when a voltage between terminals of the storage element becomes a value different from a target value by a predetermined voltage, or a higher voltage thereof,; and
      turning both the first switching elements and the second switching element ON/OFF; and
      carrying out a control operation to gradually approximate the voltage of the DC power supply to the target value.

* * * * *